United States Patent [19]

Stone

[11] Patent Number: 4,982,656
[45] Date of Patent: Jan. 8, 1991

[54] STEAMER

[76] Inventor: Earlyn Stone, 33900 Sandlewood Rd., Nuevo, Calif. 92637

[21] Appl. No.: 313,249

[22] Filed: Feb. 21, 1989

[51] Int. Cl.$^5$ .............................................. A47J 23/04
[52] U.S. Cl. ................................... 99/403; 99/426; 99/450; 126/348; 126/369; 126/382; 219/439
[58] Field of Search ................. 99/324, 403, 410, 413, 99/417, 418, 426, 450; 126/33, 348, 369, 382; 219/401, 431, 438, 439, 440; 220/23, 255, 256

[56] References Cited

U.S. PATENT DOCUMENTS

| 64,142 | 4/1867 | Potwin | 126/369 |
| 69,480 | 10/1867 | Reid | 126/369 |
| 117,356 | 7/1871 | Whitehouse | 99/417 |
| 176,612 | 4/1876 | Fosket | 126/369 |
| 1,006,792 | 10/1911 | Reubold | 220/255 |
| 1,200,741 | 10/1916 | Lindgren | 99/418 |
| 3,955,006 | 5/1976 | Sokolsky et al. | 220/256 |
| 4,425,720 | 1/1984 | Elevitch | 99/450 |
| 4,739,698 | 4/1988 | Allaire | 99/410 |

FOREIGN PATENT DOCUMENTS

| 915930 | 12/1972 | Canada | 99/410 |
| 663826 | 8/1929 | France | 99/450 |
| 412083 | 10/1945 | Italy | 219/438 |
| 2929 | of 1887 | United Kingdom | 99/403 |
| 2120530 | 12/1983 | United Kingdom | 99/410 |

Primary Examiner—Philip R. Coe
Assistant Examiner—Mark Spisich
Attorney, Agent, or Firm—Plante, Strauss, Vanderburgh & Connors

[57] ABSTRACT

There is disclosed a food steamer having a food tray with a stepped sidewall to provide a subjacent section of lesser cross-sectional area than its upper section. An internal cover is received within the upper section of the food tray and it is slidably received against the interior sidewalls of the upper section permitting adjustment of its level in the upper section whereby the volume of the food compartment beneath the internal cover can be fixedly adjusted. The steaming vessel also has an exterior cover that has a top plate with a peripheral downwardly dependent side walls which are received within the open upper edges of the food tray. In the preferred embodiment, the slidably adjustable internal cover is formed with an outer rigid frame to which is removably attached to a plastic or aluminum film permitting replacement and disposal of the film after use. The bottom wall of the food tray has a central, raised island which serves as a steam collector to receive steam from the subjacent steam generation chamber and distributor to discharge the steam into the food steaming compartment. The lower section of the food tray can be received in a conventional electric frying pan and suspended therein with its bottom wall located above the heating surface of the frying pan.

12 Claims, 4 Drawing Sheets

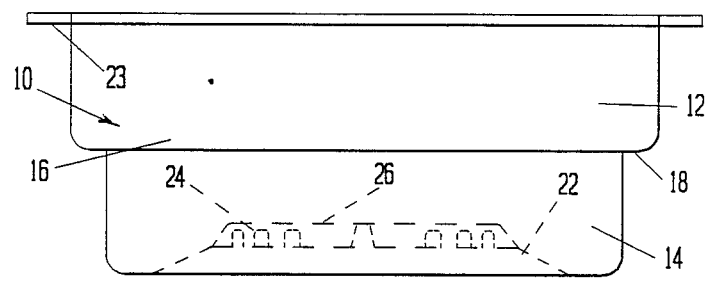
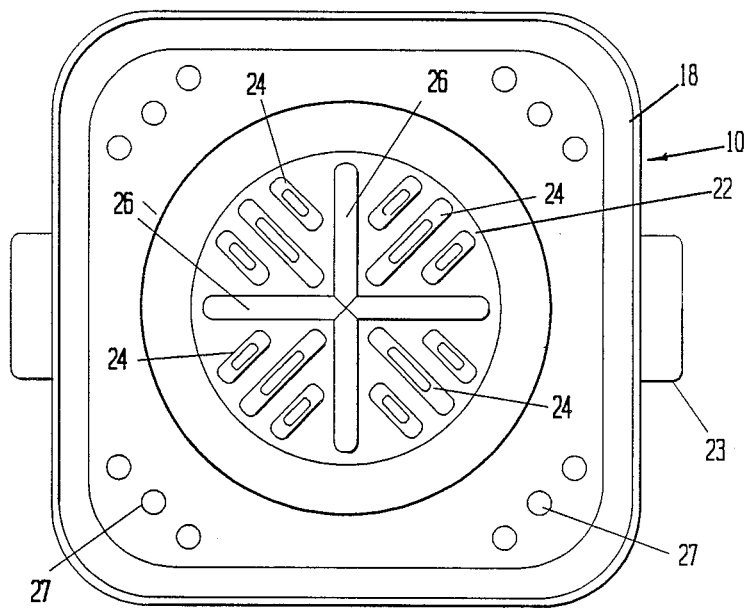

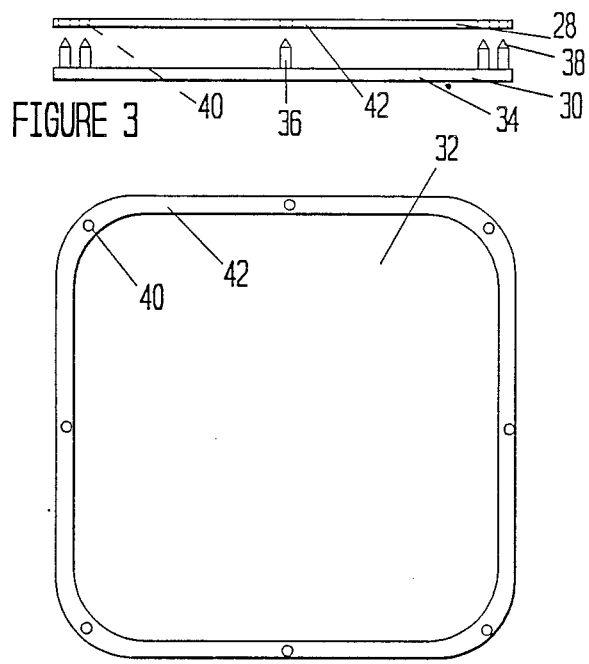
FIGURE 3
FIGURE 4
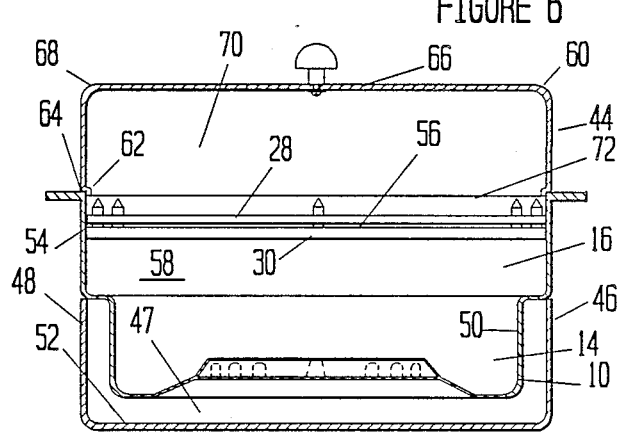
FIGURE 6

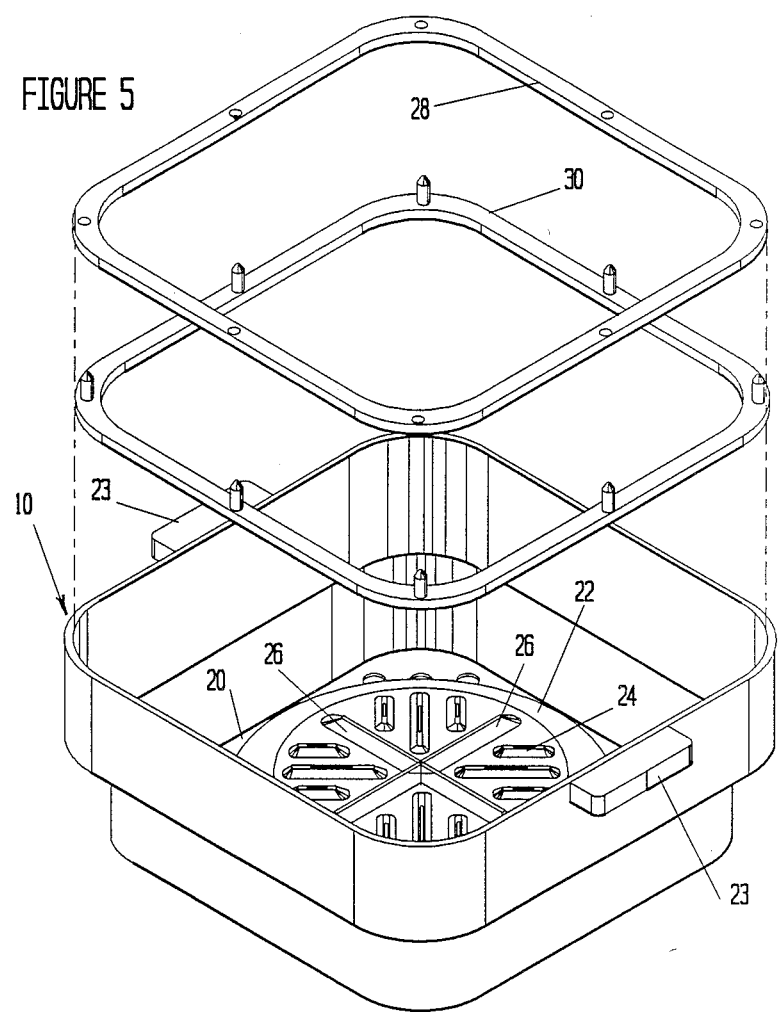

STEAMER

BACKGROUND OF THE INVENTION

1. Field of the Invention

This invention relates to a steamer and, in particular, to a steamer with a variable volume food chamber which is thermally insulated from the vessel cover.

2. Brief Statement of the Prior Art

Food steamers have been provided in various designs using one or more stacked vessels, some with their own internal heating element and others adapted for stove-top use.

None of the various prior steamers have the capability to adjust the volume of the food chamber within the steamer in accordance with the amount or size of the food being cooked. Additionally, little or no provision has been made to minimize the heat loss from the steamer through the cover or side walls of the steamer vessel. Thus, the prior art steamers have been highly inefficient experiencing substantial heat losses by refluxing of the steam, resulting in excess demands of heating and extended or prolonged cooking times.

OBJECTIVES OF THE INVENTION

It is an objective of this invention to provide a food steamer with a variable volume food compartment.

It is also an objective of this invention to provide a food steamer in which the food compartment is thermally insulated from the cover of the steaming vessel.

It is an additional objective of this invention to provide a steamer which can be used on a stove or which can be used in combination with conventional electric frying pans.

It is a further objective of this invention to provide a highly efficient steamer which provides minimal cooking time and maximum heat efficiency.

BRIEF DESCRIPTION OF THE INVENTION

This invention comprises a food steamer having a food tray with a stepped sidewall to provide a subjacent section of lessor cross-sectional area than its upper section. An internal cover is received within the upper section of the food tray and it is slidably received against the interior sidewalls of the upper section permitting adjustment of its level in the upper section whereby the volume of the food compartment beneath the internal cover can be fixedly adjusted. The steaming vessel also has an exterior cover that has a top plate with a peripheral downwardly dependent side walls which are received within the open upper edges of the food tray. In the preferred embodiment, the slidably adjustable internal cover is formed with an outer rigid frame to which is removably attached a plastic or aluminum film permitting replacement and disposal of the film after use. The bottom wall of the food tray has a central, raised island that is surrounded by a plurality of through apertures. The central island has a plurality of cross-members which are raised above its surface to provide a support and has a plurality of raised ribs of lessor height than the cross-members with slots extending coextensively with the raised ribs to provide steam risers which receive steam from the subjacent steam generation chamber and discharge the steam into the food steaming compartment. The lower section of the food tray can be received in a conventional electric frying pan and suspended therein with its bottom wall located above the heating surface of the frying pan.

BRIEF DESCRIPTION OF THE DRAWINGS

The invention will be described with reference to the FIGURES of which:

FIG. 1 is a plan view of the food tray vessel used in the steamer of the invention;

FIG. 2 is an elevational view of the food tray vessel;

FIG. 3 is an elevational view of the upper and lower frames of the internal cover of the food tray;

FIG. 4 is a plan view of the upper frame member of the inner cover;

FIG. 5 is an exploded prospective view of the food tray vessel and inner sliding cover of the food tray of the steaming vessel;

FIG. 6 is an elevational sectional view of the assembled steamer of the invention.

DESCRIPTION OF PREFERRED EMBODIMENT

Figure 6A:
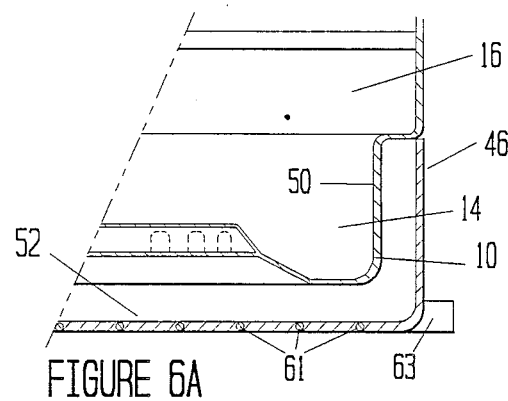
FIG. 6A illustrates an alternative embodiment.

Referring now to FIGS. 1 and 2, the food tray vessel 10 of the invention is an open-topped vessel which has a stepped sidewall 12 with a lower section 14 of lessor area than the upper section 16 and with a peripheral flat shoulder 18 between the two sections. The bottom wall 20 of the food tray vessel 10 has a raised central island 22 which has a plurality of open-slotted ribs 24 that extend vertically a slight distance above the top surface of the raised island 22. The ribs can be provided with any suitable apertures to provide for passage of steam, e.g., holes, slots, slits, etc., can be provided. The island functions as a collector of steam and distributes the steam into the cooking chamber of the food tray. The island also has one or more cross members 26 which are raised above its surface a greater height than the slotted ribs and these cross-members provide support for food and cooking vessels and the like. A plurality of apertures 27 are provided at the corners of the bottom wall 20 to serve as drains to return condensate to the steam generator (not shown) which is situated immediately beneath the illustrated food tray.

Referring now to FIGS. 3 and 4, the upper frame 28 and lower frame 30 for forming the inner sliding cover are illustrated. Each of the frames is a generally rectangular planar member having an open interior 32 and a surrounding flat strip 34. The lower frame 30 has a plurality of pins 36 which project from its upper surface. Preferably, the posts have a point 38 and are received within aligned apertures 40 through the flat strips 42 of the upper frame 28. The upper and lower frames provide a clamp to support for a sheet of plastic (not shown) which can be removably received between the frames and clamped therein to form the sliding cover.

Referring now to FIG. 5, the food tray 10 used in the steaming vessel is shown in perspective view with the upper frame 28 and lower frame 30 removed and expanded in the view. As there illustrated, the raised central island 22 in the bottom wall 20 of the food tray 10 has a pair of orthogonally oriented cross members 26 that provide a shelf support within the food tray 10. Also shown are the open slotted, raised ribs 24 which serve as risers to discharge steam into the interior of the food tray 10.

The assembled food steamer 44 is shown in elevational sectional view FIG. 6. The assembled steamer 44 includes a steam generation vessel 46 which is an open topped vessel having side walls 48 of slightly greater height than the side walls 50 of the lower section 14 of the food tray 10, thereby providing a support for the food tray within the steam generation vessel 46. Water is added to vessel 46, thereby creating a steam generation chamber between the food tray 10 and vessel 46. The sidewalls entirely surround the sidewalls 50 of the lower section of the food tray. As shown in FIG. 6A, a heating element 61 with an electrical connector plug 63 can be incorporated in the bottom wall 52 of the steam generation vessel or, alternatively, the steam generation vessel can be placed on a stove-top heating element. Preferably the central raised island 22 is located directly above and aligned with the heating element of the steam generator so that the steam passes vertically upwardly into the collector, which is the underside of the raised island 22.

The sliding internal cover 54 which is an assembly of the upper frame 28 and lower frame 30 and a removable film or foil of plastic or metal 56 is shown at an intermediate position in the upper section 16 of the food tray 10. This internally received cover 54 resiliently and frictionally engages against the inside walls of the food tray 10, and can be adjusted in its position at any height within the upper section 16 of the food tray, thereby providing a fixedly adjustable internal volume of the steaming chamber 58 within the food tray 10.

The food tray 10 is covered with a suitably shaped external metal cover 60 that fits over the open top of the food tray 10. For this purpose, the cover has an inwardly deflected peripheral lip 62 that is received within the upper peripheral edge 64 of the food tray 10, nesting in the food tray, as shown. The external cover 60 is preferably provided with a top plate 66 having downwardly dependent, substantially vertical, sidewalls 68 to thereby provide an interior chamber 70 above the food tray 10. This interior chamber 70 is separated from the steaming chamber 58 by the internally received sliding cover 54, and a thermally insulating air space 72 is thus provided between the exterior cover 60 and the steaming chamber 58. This air space prevents the cover from becoming heated to the steam temperatures, and effectively reduces much of the internal refluxing of steam which dissipates heat and retards the steaming process.

Figure 7:
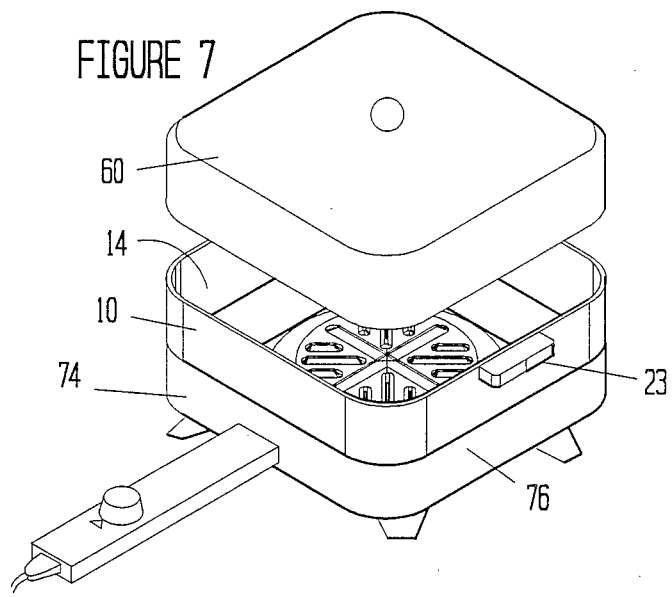
FIG. 7 illustrates the steamer positioned in a conventional electric frying pan.

As previously mentioned, the steaming vessel can be used with a conventional electric fry pan. This is illustrated in FIG. 7 in which the lower section 14 of the food tray 10 is seated in an electric fry pan 74, supported on the vertical walls 76 of the fry pan in the same manner as the suspension of the food tray is illustrated in FIG. 6 with its separate steam generation vessel 46. In this modification, the electric fry pan 74 serves as the steam generation vessel.

The invention provides the advantage of a steaming vessel having an internal steaming chamber with a fixedly adjustable internal volume, permitting accommodation or adjustment to the cooking task. Additionally, the steaming chamber is separated by an insulating, dead air space from the exterior cover of the steaming vessel, thereby greatly reducing the loss of heat from the steaming vessel. The central raised island functions as a steam collector, receiving the steam from the steam generator and distributes the steam through the slots in its raised ribs into the steaming (food) chamber. This serves to isolate the rising steam vapors from direct contact with the cooler side walls of the steam generator vessel and of the food tray, thereby improving the efficiency and providing for rapid cooking of food.

The result of the insulating dead air space in the cover, and the isolating characteristic of the steam collector and distributor is that the internal refluxing of steam within the steaming chamber is minimized and cooking times are significantly reduced with resulting reductions in heat requirements for the steaming operations.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A steaming vessel for comestibles which comprises:
  a. a food tray formed by an open-topped vessel having:
    (1) a stepped sidewall to provide an upper section and a subjacent section of lesser cross sectional area with a peripheral shoulder therebetween,
    (2) a bottom wall with a raised central island;
    (3) cross members projecting upwardly from said central island to provide a material support;
    (4) a plurality of raised ribs of lesser height than said cross members and disposed about said island, each having a through slot; and
  b. a plurality of apertures through said bottom wall at locations surrounding said raised central island;
  c. a first closure member slidably received within said upper section and having an imperforate transverse sheet to provide a cover for said food tray and thereby form a covered steaming chamber defined by the cover and food tray, said steaming chamber being of variable volume by virtue of sliding movement of the cover within said food tray;
  d. a second closure having an upper plate and a peripheral, downwardly dependent skirt with an inwardly formed lip to be received into said food tray above said first closure member; whereby said steaming vessel is provided with an upper, heat isolation chamber above said first closure member and a cooking chamber beneath said first closure member.

2. The steaming vessel of claim 1 wherein said first closure member is a plastic sheet retained in an outer frame which is resiliently engaged against the interior sidewalls of said food tray.

3. The steaming vessel of claim 2 wherein said first closure member is formed with an outer stiffening frame and a plastic film is removably secured to said frame as said imperforate, transverse sheet.

4. The steaming vessel of claim 3 wherein said outer stiffening frame is formed with a first peripheral frame member and a coacting and coextensive second frame member with said plastic film received between said frames, and with fastener means removably securing said first frame to said second frame.

5. The steaming vessel of claim 1 in combination with a steam generation vessel having interior dimensions sufficient to receive the lower section of said food tray and a sufficient height to permit said subjacent section of said food tray to be received within said steam generation vessel while providing a subjacent chamber to receive water for steam generation.

6. The steaming vessel of claim 5 including a heating element in the bottom wall of said steam generation vessel.

7. The steaming vessel of claim 5 wherein said steam generation vessel is an electric frying pan with a flat bottom containing a heating element and substantially vertical sidewalls.

8. The steaming vessel of claim 7 wherein said food tray and said first and second closure members and said frying pan have a square cross section.

9. A steaming vessel for comestibles which comprises:
  a. a food tray formed by an open-topped vessel having:
    (1) a stepped sidewall to provide an upper section and a subjacent section of lesser cross sectional area with a peripheral shoulder therebetween,
    (2) a bottom wall having a plurality of through apertures;
  b. a first closure member slidably received within said upper section and having an imperforate transverse sheet to provide a cover for said food tray and thereby form a covered steaming chamber defined by the cover and food tray, said steaming chamber being of variable volume by virtue of sliding movement of the cover within said food tray; and
  c. a second closure having an upper plate and a peripheral, downwardly dependent skirt with an inwardly formed lip to be received into said food tray above said first closure member; whereby said steaming vessel is provided with an upper, heat isolation chamber above said first closure member and a cooking chamber beneath said first closure member.

10. The steaming vessel of claim 9 wherein said first closure member comprises an outer stiffening frame formed with a first peripheral frame member and a coacting and coextensive second frame member, and said imperforate transverse sheet comprises a film received between said frames, and with fastener means removably securing said first frame to said second frame.

11. The steaming vessel of claim 10 in combination with a steam generation vessel having interior dimensions sufficient to receive the lower section of said food tray and a sufficient height to permit said subjacent section of said food tray to be received with said steam generation vessel while providing a subjacent chamber to receive water for steam generation.

12. The steaming vessel of claim 9 wherein said food tray and said first and second closure members have a square cross section.

* * * * *

UNITED STATES PATENT AND TRADEMARK OFFICE
CERTIFICATE OF CORRECTION

PATENT NO. : 4,982,656

DATED : January 8, 1991

INVENTOR(S) : Earlyn Stone

It is certified that error appears in the above-identified patent and that said Letters Patent is hereby corrected as shown below:

Col. 6, line 23, delete "with" and insert therefor ---within---.

Signed and Sealed this

Twenty-first Day of July, 1992

Attest:

DOUGLAS B. COMER

*Attesting Officer*     *Acting Commissioner of Patents and Trademarks*